United States Patent Office 3,546,214
Patented Dec. 8, 1970

---

3,546,214
AMINO-SUBSTITUTED DIBENZ[b,f][1,4]OXAZEPIN-11(10H)-ONES
Günther Schmidt, Biberach an der Riss, Germany, assignor to Boehringer Ingelheim G.m.b.H., Ingelheim (Rhine), Germany, a corporation of Germany
No Drawing. Filed July 10, 1968, Ser. No. 743,601
Claims priority, application Germany, July 11, 1967, 1,695,900
Int. Cl. C07d 87/54
U.S. Cl. 260—239.3                    8 Claims

ABSTRACT OF THE DISCLOSURE

The compounds are amino-substituted dibenz[b,f][1,4]oxazepin-11(10H)-ones and acid addition salts thereof, useful as analgesics, antipyretics and sedatives in warm-blooded animals.

---

This invention relates to novel amino-dibenz[b,f][1,4]oxazepin-11(10H)-ones and acid addition salts thereof, as well as to a method of preparing these compounds.

More particularly, the present invention relates to a novel class of dibenz[b,f][1,4]oxazepin-11(10H)-ones of the formula

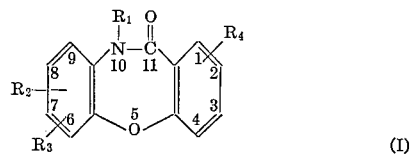

wherein:

$R_1$ is hydrogen or straight or branched lower alkyl,
$R_2$ is hydrogen, halogen or lower alkyl, and
$R_3$ and $R_4$ are each amino or hydrogen, with the proviso that $R_3$ and $R_4$ are not both hydrogen or both amino at the same time, and their non-toxic, pharmacologically acceptable acid addition salts.

The novel compounds according to the present invention are prepared by reducing a compound of the formula

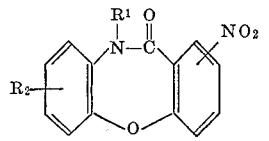

or

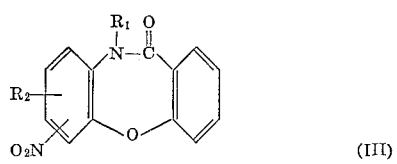

wherein $R_1$ and $R_2$ have the meanings as in Formula I, pursuant to known methods.

The reduction is preferably performed with catalytically activated hydrogen in the presence of a hydrogenation catalyst, for example in presence of a noble metal catalyst, such as palladium or platinum, or in presence of Raney nickel. The reduction is preferably performed at temperatures between 10 and 100° C. and in the presence of a solvent. If Raney nickel is used as the catalyst, a pressure of up to 100 atmospheres is preferably applied; however, hydrogenation in the presence of a noble metal catalyst is performed at atmospheric pressure. Examples of suitable solvents are aliphatic alcohols, glycolic ether, dioxane, tetrahydrofuran, dimethylformamide, pyridine, glacial acetic acid, ethylacetate, acetone and water.

However, the reduction may also be performed according to all other known methods for the conversion of an aromatic nitro group into an aromatic amino group. For example, the reduction may be carried out with nascent hydrogen, generated by a metal, such as iron, zinc or tin, and a mineral acid; this reaction is also advantageously performed in the presence of a solvent, such as water, alcohol or glacial acetic acid. Furthermore, tin-II-chloride in acid solution, sodium dithionite in neutral or weakly alkaline solution; iron-II-hydroxide in alkaline solution; hydrazine in aqueous or alcoholic solution, optionally in the presence of Raney nickel; sulfites, such as sodium sulfite or sodium hydrogen sulfite; aluminum in alkaline aqueous or alcoholic solution; or aluminum amalgam may be used for the reduction. In conjunction with all these reducing methods, the reaction mixture is worked up in the way known from the literature, as illustrated by the examples.

If a compound of the Formula I is formed in which $R_1$ is hydrogen, this compound can be optionally transformed by alkylation in a known manner into a compound of the Formula I in which $R_1$ is straight or branched lower alkyl.

The starting materials of Formulas II and III are either known from the literature (Dutch patent application 66,08671, published Dec. 27, 1966) or may be obtained according to methods known from the literature, for example by reaction of a correspondingly substituted o-aminophenol with a correspondingly substituted o-halobenzoic acid in the presence of a halogenating agent, such as thionylchloride, whereby a compound of the formula

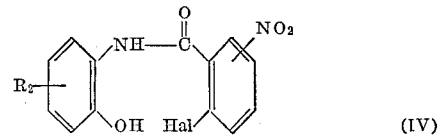

or

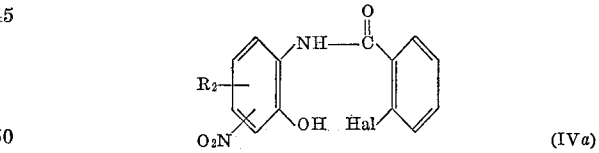

is formed, in which $R_2$ has the same meanings as in Formula I and Hal is halogen, and subsequent cyclization of compound IV or IVa in the presence of a strong base, whereby a compound of the Formula II or III is formed in which $R_1$ is hydrogen, which may subsequently, if desired, be alkylated in a known manner, for example, with an alkylhalide, whereby a compound of the Formula II or III is obtained in which $R_1$ is straight or branched alkyl.

The compounds of the Formula I are organic bases and therefore form acid addition salts with inorganic or organic acids. Examples of non-toxic, pharmacologically acceptable acid addition salts are those formed with hydrochloric acid, hydrobromic acid, sulfuric acid, citric acid, succinic acid, tartaric acid, adipic acid, fumaric acid, maleic acid, 8-chlorotheophylline or the like.

The following examples further illustrate the present invention and will enable others skilled in the art to understand it more completely. It should be understood, however, that the invention is not limited solely to the particular examples given below.

EXAMPLE 1

Preparation of 2-amino-dibenz[b,f][1,4]
oxazepin-11(10H)-one

This compound was obtained from 2-nitro-dibenz[b,f]
[1,4]oxazepin-11(10H)-one by the following reducing
methods:

(a) 12.8 gm. of 2-nitro-dibenz[b,f][1,4]oxazepin-
11(10H)-one were suspended in 200 ml. of dioxane, the
suspension was admixed with 2 gm. of Raney nickel,
and the mixture was hydrogenated in an autoclave at
50° C. and 31 atmospheres pressure. After approximately
2 hours the absorption of hydrogen had gone to com-
pletion. The catalyst was filtered off, the filtrate was
evaporated to dryness, and the residue was recrystal-
lized from ethanol, yielding 2-amino-dibenz[b,f][1,4]
oxazepin-11(10H)-one, M.P. 200–202° C., of the formula

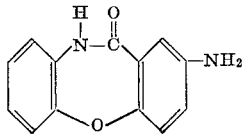

*Analysis.*—Calculated for $C_{13}H_{10}N_2O_2$ (mol wt. 226.2)
(percent): C, 69.02; H, 4.46; N, 12.38. Found (percent):
C, 69.10; H, 4.58; N, 12.45.

Hydrochloride.—From the base, by addition of ethe-
real hydrochloric acid. After recrystallization from dilute
aqueous hydrochloric acid: M.P. >320° C. (decomposi-
tion).

*Analysis.*—Calculated for $C_{13}H_{11}ClN_2O_2$ (mol wt.
262.7): C, 59.44; H, 4.22; Cl, 13.50; N, 10.67. Found
(percent): C, 59.70; H, 4.25; Cl, 13.66; N, 10.77.

(b) 5 gm. of 2 - nitro - dibenz[b,f][1,4]oxazepin-11-
(10H)-one was suspended in 150 ml. of methanol the
suspension was admixed with 0.3 gm. of platinum oxide,
and the mixture was hydrogenated at room temperature
and atmospheric pressure. After 100 minutes the calcu-
lated amount of hydrogen had been absorbed. After filter-
ing off the catalyst, the filtrate was evaporated to dryness
in vacuo, and the residue was recrystallized from aqueous
50% dimethylformamide. The product had a melting
point of 200–202° C.

(c) 5 gm. of 2-nitro - dibenz[b,f][1,4]oxazepin - 11-
(10H)-one were suspended in 150 ml. of methanol, the
suspension was admixed with 0.5 gm. of palladized char-
coal, and the mixture was hydrogenated at room tempera-
ture and atmospheric pressure. After 3 hours the calcu-
lated amount of hydrogen had been absorbed. After hav-
ing filtered off the catalyst, the filtrate was evaporated
to dryness in vacuo, and the residue was recrystallized
from aqueous 50% dimethylformamide. The product had
a melting point of 200–202° C.

(d) A mixture of 1.3 gm. (0.005 mol) of 2-nitro-di-
benz[b,f][1,4]oxazepin-11(10H)-one, 1.8 gm. of tin and
80 ml. of ethanol was heated to the boiling point of the
ethanol. Over a period of 15 minutes 6.2 ml. of 5 N
hydrochloric acid were added dropwise to the mixture,
and the mixture was then refluxed for 1.5 hours. The re-
action solution was filtered while still hot, the filtrate was
evaporated in vacuo, the residue was admixed with ether,
and the precipitated crystals were recrystallized from
aqueous 50% dimethylformamide. The product had a
melting point of 200–202° C.

(e) 2.56 gm. (0.01 mol) of 2-nitro-dibenz[b,f[]1,4]-
oxazepin-11(10H)-one were suspended in 60 ml. of
ethanol, the suspension was admixed with 2 ml. (ap-
prox. 0.03 mol) of aqueous 80% hydrazine hydrate, and
the mixture was refluxed for 1.5 hours in the presence of
a spatula-tipful of Raney nickel. The reaction mixture was
filtered while still hot, and the filtrate was evaporated in
vacuo. The residue was recrystallized from aqueous 50%
dimethylformamide. The product had a melting point of
200–202° C.

(f) 1 gm. of 2 - nitro - dibenz[b,f][1,4]oxazepin-11-
(10H)-one was suspended in 60 ml. of ethanol, and the
suspension was heated to boiling. A solution of 3.5 gm. of
sodium dithionite in 16 ml. of water was added dropwise
to the suspension over a period of 10 minutes, and the
mixture was refluxed for 1 hour. Thereafter, it was filtered
while still hot, and the filtrate was evaporated to dryness
in vacuo. The residue was refluxed for 1 hour in 50 ml.
of water. After cooling, the crystals were collected by
vacuum filtration and recrystallized from aqueous 50%
dimethylformamide. The product had a melting point of
200–202° C.

(g) 1.3 gm. of 2 - nitro-dibenz[b,f][1,4]oxazepin-11-
(10H)-one were suspended in 100 ml. of ethanol, and the
suspension was admixed with 2.85 gm. of tin-(II)-chlo-
ride. The mixture was heated to boiling, and 6.2 ml. of
5 N hydrochloric acid were added dropwise over a period
of 20 minutes. The resulting solution was refluxed for 1.5
hours, filtered while hot and partially evaporated in vacuo.
The residue was admixed with 100 ml. of ether, and the
precipitated crystals were collected by vacuum filtration,
washed with 200 ml. of hot methylenechloride, then stirred
with dilute sodium hydroxide solution, washed with water
and recrystallized from aqueous 50% dimethylform-
amide. The product had a melting point of 200–202° C.

(h) 1 gm. of 2 - nitro - dibenz[b,f][1,4]oxazepin-11-
(10H)-one was suspended in ethanol. 1.5 ml. of con-
centrated hydrochloric acid were added to the suspension,
and the mixture was heated to boiling. While boiling, 1.7
gm. of iron powder were added over a period of 30 min-
utes. After stirring for 5 hours under reflux, the mixture
was made alkaline with dilute sodium hydroxide solution
and was then vacuum filtered. The filter cake was boiled
with 50 ml. of methylene chloride, the methylene chloride
solution was evaporated in vacuo, and the residue was re-
crystallized from aqueous 50% dimethylformamide. The
product had a melting point of 200–202° C.

EXAMPLE 2

Preparation of 3-amino-dibenz[b,f][1,4]oxazepin-
11(10H)-one 5 gm. of 3-nitro-dibenz[b,f][1,4]oxazepin - 11(10H)-
one and 2 gm. of Raney nickel were suspended in 100 ml.
of methanol, and the suspension was hydrogenated at
room temperature and atmospheric pressure. After ap-
proximately 4 hours the calculated quantity of hydrogen
has been absorbed. The reaction mixture was then ad-
mixed with 100 ml. of dioxan, heated until the precipitate
had redissolved, and the Raney nickel was filtered off. The
filtrate was evaporated to dryness in vacuo, and the residue
was recrystallized from aqueous 20% dimethylformamide.
The product, M.P. 287–289° C., was identified to be 3-
amino-dibenz[b,f][1,4]oxazepin-11(10H)-one.

*Analysis.*—Calculated for $C_{13}H_{10}N_2O_2$ (mol wt. 226.2)
(percent): C, 69.02; H, 4.46; N, 12.38. Found (percent):
C, 68.80; H, 4.56; N, 12.38.

EXAMPLE 3

Preparation of 7-amino-dibenz[b,f][1,4]oxazepin-
11(10H)-one 12.5 gm. of 7 - nitro - dibenz[b,f][1,4]oxazepin-11-
(10H)-one and 5 gm. of Raney nickel were suspended in
200 ml. of methanol, and the suspension was hydrogenated
at room temperature and 6 atmospheres. After approxi-
mately 17 hours the calculated amount of hydrogen had
been absorbed. The reaction solution was admixed with
100 ml. of dimethylformamide, the mixture was heated
until the precipitate had redissolved, and then the catalyst
was filtered off. The filtrate was partially evaporated in
vacuo, the residue was admixed with 200 ml. of ethanol,
and the crystals precipitated thereby were collected by
vacuum filtration and recrystallized from a mixture of
dimethylformamide and water (9:1) in the presence of activated charcoal. The product, M.P. 268–271° C., was identified to be 7 - amino - dibenz[b,f][1,4]oxazepin-11-(10H)-one.

*Analysis.*—Calculated for $C_{13}H_{10}N_2O_2$ (mol wt. 226.2) (percent): C, 69.02; H, 4.46; N, 12.38. Found (percent): C, 68.85; H, 4.44; N, 12.58.

EXAMPLE 4

Preparation of 2-amino-10-methyl-dibenz[b,f][1,4]oxazepin-11(OH)-one 6.2 gm. of 2 - nitro - 10 - methyl - dibenz[b,f][1,4]oxazepin-11(10H)-one and 2 gm. of Raney nickel were suspended in 100 ml. of methanol, the suspension was hydrogenated at room temperature and atmospheric pressure. After approximately 7 hours the calculated amount of hydrogen had been absorbed. The catalyst was filtered off, the filtrate was evaporated to dryness in vacuo, and the residue was recrystallized from a mixture of isopropanol and water (1:1) and then from ethanol in the presence of activated charcoal. The product, M.P. 133–136° C., was identified to be 2-amino-10-methyl-dibenz[b,f][1,4]oxazepin-11(10H)-one.

*Analysis.*—Calculated for $C_4H_{12}N_2O_2$ (mol. wt. 240.3): C, 69.99%; H, 5.03%; N, 11.66%. Found C, 70.25%; H, 5.50%; N, 11.76%.

EXAMPLE 5

Preparation of 2-amino-10-ethyl-dibenz[b,f][1,4]oxazepin-11(10H)-one (a) 10.0 gm. of 2-nitro-10-ethyl-dibenz[b,f][1,4]oxazepin-11(10H)-one were hydrogenated in 100 ml. of dioxan in the presence of 2 gm. of Raney nickel according to the process described in Example 1(a). The product thus obtained was recrystallized from isopropanol, whereupon it had a M.P. of 165–166° C.

*Analysis.*—Calculated for $C_{15}H_{14}N_2O_2$ (254.3); C, 70.85%; H, 5.55%; N, 11.02%. Found: C, 70.90%; H, 5.63%; N, 10.78%.

(b) This compound was also prepared in the following way:

2.96 gm. (0.035 mol) of potassium methylate (95%) were dissolved in a mixture of 50 ml. of tertiary butanol and 50 ml. of absolute dioxan while heating. To this solution 6.78 gm. (0.03 mol) of 2-amino-dibenz[b,f][1,4]oxazepin-11(10H)-one (prepared according to Example 1) were added. The reaction mixture was refluxed for 45 minutes. Then a solution of 5.15 gm. (0.033 mol) of ethyliodide in 10 ml. of absolute dioxan was added dropwise, and refluxing was continued for 7 hours. After cooling, the reaction mixture was filtered, the filtrate was evaporated in vacuo, and the residue was recrystallized first from n-propanol, then from aqueous 40% ethanol in the presence of charcoal, and finally from isopropanol. The product had a MP. of 165–166° C.

EXAMPLE 6

Preparation of 2-amino-8-methyl-dibenz[b,f][1,4]oxazepin-11(10H)-one 9 gm. of 2 - nitro - 8 - methyl - dibenz[b,f][1,4]oxazepin-11(10H)-one were hydrogenated in 150 ml. of dioxan in the presence of 2 gm. of Raney nickel at 90° C. and 51 atmospheres in the manner described in Example 1(a). The product had a M.P. of 169–170° C. (recrystallized from isopropanol).

*Analysis.*—Calculated for $C_{14}H_{12}N_2O_2$ (mol. wt. 240.3): C, 69.99%; H, 5.03%; N, 11.66%. Found: C, 70.10%; H, 5.22%; N, 11.65%.

The hydrochloride was obtained by dissolving the base in isopropanol and acidifying the solution with ethereal hydrochloric acid. M.P.>300° C. (decomposition).

*Analysis.*—Calculated $C_{14}H_{13}ClN_2$ mol. wt. 276.7); C, 60.77%; H, 4.74%; Cl, 12.81%; N, 10.12%. Found: C, 61.10%; H, 4.84%; Cl, 12.95%; N, 10.14%.

EXAMPLE 7

Preparation of 10-ethyl-2-amino-8-methyl-dibenz[b,f][1,4]oxazepin-11(10H)-one 14.9 gm. of 10-ethyl-8-methyl-2-nitro-dibenz[b,f][1,4]oxazepin-11(10H)-one were hydrogenated in 100 ml. of dioxan in the presence of 2 gm. of Raney nickel at 90° C. and 51 atmospheres in the manner described in Example 1(a). The product had a M.P. of 114–115° C. [recrystallized from benzene/cyclohexane (1:1)].

*Analysis.*—Calculated for $C_{16}H_{16}N_2O_2$ (mol. wt. 268.3). C, 71.62% H, 6.01%; N, 10.44%. Found: C, 71.50%; H, 5.91%; N, 10.27%.

The hydrochloride was obtained by dissolving the base in isopropanol and acidifying the solution with ethereal hydrochloric acid M.P. 248–250° C. (decomposition).

*Analysis.*—Calculated for $C_{16}H_{17}ClN_2O_2$ (mol. wt. 304.8): C, 63.05%; H, 5.62%; Cl, 11.64%; N, 9.19%. Found: C, 63.40%; H, 5.64%; Cl, 11.47%; N, 9.44%.

EXAMPLE 8

Preparation of 2-amino-8-chloro-dibenz[b,f][1,4]oxazepin-11(10H)-one 10 gm. of 2-nitro-8-chloro-dibenz[b,f][1,4]oxazepin-11(10H)-one were hydrogenated in the presence of 2 gm. of Raney nickel in 150 ml. of dioxan at 90° C. and 51 atmospheres, as described in Example 1(a). The raw product was recrystallized from a mixture of isopropanol and dioxan (1:1), whereupon it had a M.P. of 266–267° C.

*Analysis.*—Calculated for $C_{13}H_9ClN_2O_2$ (mol. wt. 260.7): C, 59.89%; H, 3.48%; Cl, 13.60%; N, 10.75%. Found: C, 59.90%; H, 3.43%; Cl, 13.43%; N, 10.78%.

The hydrochloride was obtained by dissolving the base in isopropanol and acidifying the solution with ethereal hydrochloric acid. M.P.>300° C. (decomposition).

*Analysis.*—Calculated for $C_{13}H_{10}Cl_2N_2O_2$ (mol. wt. 297.2): C, 52.55%; H, 3.39%; Cl, 23.86%; N, 9.43%. Found: C, 52.70%; H, 3.38%; Cl, 23.62%; N, 9.69%.

EXAMPLE 9

Preparation of 2-amino-8-chloro-10-ethyl-dibenz[b,f][1,4]oxazepin-11(10H)-one 10.8 gm. of 2-nitro-8-chloro-10-ethyl-dibenz[b,f][1,4]oxazepin-11(10H)-one were hydrogenated in the presence of 1 gm. of Raney nickel in 100 ml. of dioxan in the manner described in Example 1(a). The product had a M.P. of 166–167° C. (recrystallized from isopropanol).

*Analysis.*—Calculated for $C_{15}H_{13}ClN_2O_2$ (mol. wt. 288.8): C, 62.40%; H, 4.54%; Cl, 12.28%; N, 9.70%. Found: C, 62.90%; H, 4.61%; Cl, 12.32%; N, 9.76%.

The hydrochloride was obtained by dissolving the base in isopropanol and acidifying the solution with ethereal hydrochloric acid. M.P.>255° C. (decomposition).

*Analysis.*—Calculated for $C_{15}H_{14}Cl_2N_2O_2$ (mol. wt. 325.2); C, 55.40%; H, 4.34%; Cl, 21.81; N, 8.61. Found: C, 55.60%; H, 4.52%; Cl, 21.60%; N, 8.68%.

EXAMPLE 10

Preparation of 3-amino-10-methyl-dibenz[b,f][1,4]oxazepin-11(10H)-one 7.1 gm. of 10-methyl-3-nitro-dibenz[b,f][1,4]oxazepin-11(10H)-one were suspended in 50 ml. of ethanol, 2.5 gm. of Raney nickel were added to the suspension and the mixture was hydrogenated at 50° C. and at a pressure of 50 atmospheres. After the calcuated amount of hydrogen had been absorbed the catalyst was filtered off, the filtrate was evaporated in vacuo, and the crystalline residue was recrystallized from ethanol in the presence of charcoal. The product had a M.P. of 187–189° C.

*Analysis.*—Calculated for $C_{14}H_{12}N_2O_2$ (mol. wt. 240.3): C, 69.99%; H, 5.03%; N, 11.66%. Found: C, 69.80%; H, 5.07%; N, 11.78%.

EXAMPLE 11

Preparation of 7-amino-10-methyl-dibenz[b,f][1,4]-oxazepin-11(10H)-one 9.2 gm. of 10-methyl-7-nitro-dibenz[b,f][1,4]oxazepin-11(10H)-one were hydrogenated in the presence of 3 gm. of Raney nickel in 100 ml. of methanol analogous to the method described in Example 3. Then, 100 ml. of chloroform were added, the catalyst was filtered off and the filtrate was evaporated in vacuo until a volume of 40 ml. had been reached. The precipitated crystals were filtered off and recrystallized from ethanol in the presence of charcoal. The product had a M.P. of 194–196° C.

*Analysis.*—Calculated for $C_{14}H_{12}N_2O_2$ (mol. wt. 240.3): C, 69.99%; H, 5.03%; N, 11.66%. Found: C, 70.20%; H, 5.28%; N, 11.92%.

The compounds according to the present invention, that is, those embraced by Formula I above and their non-toxic, pharmacologically acceptable acid addition salts, have useful pharmacodynamic properties. More particularly, they exhibit analgesic, antipyretic and sedative activities in warm-blooded animals, such as mice and rats, as evidenced by the following pharmacological tests.

*Analgesic activity.*—The analgesic activity was determined on mice, using the Dieffenbach tail clamp, according to the standard test method of Haffner (Dtsch. Med. Wscher. 1929, 731). This tail clamp applies a pressure of 300 to 400 gm. upon being opened to the diameter of the root of the mouse tail. For the investigation adult male mice of NMRI-strain with an average body weight of 20 gm. were used. The compounds under investigation were administered perorally as a triturate in methylcellulose with a stomach tube. The tail clamp was repeatedly applied at 30 minute intervals to determine how many animals no longer reacted to the pain stimulus. The dose required to prevent reaction in 50 percent of the animals ($ED_{50}$) was extrapolated graphically from the data obtained at different dose levels. The maximum activity was found after 30 minutes for every substance tested.

For the following substances the analgesic $ED_{50}$-values were determined:

2-amino-dibenz[b,f][1,4]oxazepin-11(10H)-one hydrochloride;
2-amino-10-methyl-dibenz[b,f][1,4]oxazepin-11(10H)-one and
2-amino-8-chloro-dibenz[b,f][1,4]oxazepin-11(10H)-one hydrochloride.

These $ED_{50}$-values ranged between 80 and 200 mg./kg. mouse when perorally administered.

*Antipyretic activity.*—The determination of antipyretic activity was carried out using rats with normal body temperature. FW 49-rats with an average body weight of 140 gm. were employed. The substances to be tested were administered perorally as a triturate in methylcellulose with a stomach tube.

The course of the body temperature was measured continuously by means of a thermocouple placed in the rectum. The climatic conditions were kept constant during the experiments. The compounds under investigation were given after a period of at least 1 hour, during which the body temperature of the individual untreated animal reached a constant value. The average maximal decrease of temperature was determined for the following compounds:

2-amino-dibenz[b,f][1,4]oxazepin-11(10H)-one hydrochloride;
2-amino-10-ethyl-dibenz[b,f][1,4]oxazepin-11(10H)-one;
2-amino-8-chloro-10-ethyl-dibenz[b,f][1,4]oxazepin-11(10H)-one hydrochloride;
3-amino-dibenz[b,f][1,4]oxazepin-11(10H)-one and
7-amino-10-methyl-dibenz[b,f][1,4]oxazepin-11(10H)-one.

These compounds caused a decrease in the body temperature ranging between 3 and 5° C., when administered at a dose of 200 mg./kg. rat per os.

*Sedative activity.*—The sedative activity was determined by a method based on that of Friebel et al. (Arzneimittelforschung 9, 126 [1959]). Groups of 10 mice were placed in a cylindrical vessel with a glass-floor, under which 10 photo-cells were mounted. Light beams were directed from above. When the mice ran over the photo-cells, counting relays were activated, registering the interruptions of the light beams. The experiments were carried out 30 minutes after administration of the test compound. The compounds were administered perorally as a triturate in methylcellulose with a stomach tube. A control group received only the suspension medium. The motility values of the groups which received the substances were expressed as a percent of the motility value of the control group. The $ED_{50}$-value is the dose that causes a 50 percent inhibition of motility.

The following substances showed a sedative $ED_{50}$ between 21 and 55 mg./kg. mouse p.o.:

2-amino-dibenz[b,f][1,4]oxazepin-11(10H)-one hydrochloride;
2-amino-10-methyl-dibenz[b,f][1,4]oxazepin-11(10H)-one;
2-amino-8-methyl-dibenz[b,f][1,4]oxazepin-11(10H)-one hydrochloride and
2-amino-8-chloro-dibenz[b,f][1,4]oxazepin-11(10H)-one hydrochloride.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.415 to 4.2 mgm./kg. body weight.

Besides the compounds according to the invention the pharmaceutical compositions may also comprise one or more other active ingredients, such as caffeine, acetylsalicylic acid, antiphlogistics such as 1,2-diphenyl-3,5-dioxo-4-n-butylpyrazolidine, sleep-inducing agents such as 5-(1-cycloheptenyl)-5-ethyl-barbituric acid, or secretolytics such as N-(2-amino-3,5-dibromobenzyl)-N-methyl-cyclohexylammonium chloride.

The following examples illustrate a few dosage unit compositions comprising a compound of the instant invention as an active ingredient and represent the best mode contemplated of putting the invention to practical use. The parts are parts by weight unless otherwise specified.

EXAMPLE 12

Tablets

The tablet composition was compounded from the following ingredients:

| | Parts |
|---|---|
| 2-amino-dibenz[b,f][1,4]oxazepin-11(10H)-one hydrochloride | 100.0 |
| Secondary calcium phosphate | 98.0 |
| Potato starch | 45.0 |
| Polyvinylpyrrolidone | 5.0 |
| Magnesium stearate | 2.0 |
| Total | 250.0 |

*Compounding procedure.*—The benzoxazepinone compound was admixed with the potato starch and the calcium phosphate, the mixture was moistened with an aqueous 10% solution of the polyvinylpyrrolidone, the moist mass was granulated through a 1.5 mm.-mesh screen. The granulate thus obtained was admixed with the magnesium stearate and the composition was pressed into 250 mgm.-tablets. Each tablet contained 100 mgm. of the benzoxazepinone compound and, when administered perorally to a warm-blooded animal of about 60 kg. body weight in need of such treatment, produced very good analgesic effects.

EXAMPLE 13

Coated pills

The tablet composition of Example 12 was pressed into 250 mgm.-pill cores, which were then coated with a thin shell consisting essentially of talcum and sugar, and the coated pills were polished with beeswax. Each coated pill contained 100 mgm. of the benzoxazepinone compound and, when administered perorally to a warm-blooded animal of about 60 kg. body weight in need of such treatment, produced very good analgesic effects.

EXAMPLE 14

Suppositories

The suppository composition was compounded from the following ingredients:

| | Parts |
|---|---|
| 2-amino-dibenz[b,f][1,4]oxazepin-11(10H) - one hydrochloride | 150.0 |
| Coca butter | 1600.0 |
| Total | 1750.0 |

Compounding procedure

The finely pulverized benzoxazepinone compound was stirred by means of an immersion homogenizer into the cocoa butter which had been melted and cooled to 40° C. The composition was poured at 37° C. into slightly precooled suppository molds, each holding 1750 mgm. of the composition. Each suppository contained 150 mgm. of the benzoxazepinone compound and, when administered by the rectal route to a warm-blooded animal of about 60 kg. body weight in need of such treatment, produced very good analgesic effects.

EXAMPLE 15

Tablets with combination of active ingredients

The tablet composition was compounded from the following ingredients:

| | Parts |
|---|---|
| 2-amino-dibenz[b,f][1,4]oxazepin - 11(10H) - one hydrochloride | 100.0 |
| N-(2'-amino-3',5'-dibromo-benzyl) - N - methyl - cyclohexyl-ammonium chloride | 4.0 |
| Calcium phosphate | 96.0 |
| Potato starch | 43.0 |
| Polyvinylpyrrolidone | 5.0 |
| Magnesium stearate | 2.0 |
| Total | 250.0 |

*Compounding procedures.*—The composition was compounded analogous to Example 12, and the finished composition was pressed into 250 mgm.-tablets. Each tablet contained 100 mgm. of the benzoxazepinone compound and 4 mgm. of the ammonium compound and, when administered perorally to a warm-blooded animal of about 60 kg. body weight in need of such treatment, produced very good analgesic and secretolytic effects.

EXAMPLE 16

Coated pills with combination of active ingredients

The pill core composition was compounded from the following ingredients:

| | Parts |
|---|---|
| 2-amino-dibenz[b,f][1,4]oxazepin - 11(10H) - one hydrochloride | 100.0 |
| 1,2-diphenyl-3,5-dioxo-4-n-butyl-pyrazolidine | 100.0 |
| Lactose | 128.0 |
| Corn starch | 60.0 |
| Gelatin | 8.0 |
| Magnesium stearate | 4.0 |
| Total | 400.0 |

*Compounding procedure.*—The benzoxazepinone and pyrazolidine compounds were admixed with the lactose and corn starch, the mixture was granulated with an aqueous 10% solution of the gelatin through a 1.5 mm.-mesh screen, dried at 45° C. and again passed through the screen. The granulate thus obtained was admixed with the magnesium stearate and pressed into 400 mgm.-pill cores, which were then coated with a thin shell consisting essentially of talcum and sugar, and polished with beeswax. Each coated pill contained 100 mgm. of the benzoxazepinone compound and 100 mgm. of the pyrazolidine compound and, when administered perorally to a warm-blooded animal of about 60 kg. body weight in need of such treatment, produced very good analgesic and antiphlogistic effects.

EXAMPLE 17

Suppositories with combination of active ingredients

The suppository composition was compounded from the following ingredients:

| | Parts |
|---|---|
| 2-amino-dibenz[b,f][1,4] - oxazepin - 11(10H) - one hydrochloride | 50.0 |
| 1,2-diphenyl-3,5-dioxo-4-n-butyl-pyrazolidine | 30.0 |
| 5-(1 - cycloheptenyl)-5-ethyl-barbituric acid | 50.0 |
| Cocoa butter | 900.0 |
| Total | 1030.0 |

*Compounding procedure.*—The individual ingredients were combined in a manner analogous to that described in Example 14, and the resultant composition was made into 1030 mgm.-suppositories. Each suppository contained 50 mgm. of the benzoxazepinone compound, 30 mgm. of the pyrazolidine compound and 50 mgm. of the barbituric acid compound and, when administered by the rectal route to a warm-blooded animal of about 60 kg. body weight in need of such treatment, produced very good analgesic, antiphlogistic and sleep-inducing effects.

EXAMPLE 18

Tablets with combination of active ingredients

The tablet composition was compounded from the following ingredients:

| | Parts |
|---|---|
| 2-amino-dibenz[b,f][1,4]oxazepin - 11(10H) - one hydrochloride | 100.0 |
| Caffeine | 50.0 |
| Cellulose, microcrystalline | 54.0 |
| Polyvinylpyrrolidone | 4.0 |
| Magnesium stearate | 2.0 |
| Total | 220.0 |

*Compounding procedure.*—The dibenzoxazepinone compound and the caffeine were admixed with the cellulose, and the mixture was moistened with an aqueous 10% solution of the polyvinyl pyrrolidone, granulated through a 1.5 mm.-mesh screen, dried at 45° C. and passed once more through a 1.0 mm.-mesh screen. The granulate was admixed with the magnesium stearate, and the composition was pressed into 220 mgm.-tablets. Each tablet contained 100 mgm. of the benzoxazepinone compound and 50 mgm. of caffeine and, when administered perorally to a warm-blooded animal of about 60 kg. body weight in need of such treatment, produced very good analgesic and CNS stimulating effects.

EXAMPLE 19

Tablets with combination of active ingredients.

The tablet composition was compounded from the following ingredients:

|  | Parts |
|---|---|
| 2-amino-dibenz[b,f][1,4]oxazepin - 11(10H)-one hydrochloride | 60.0 |
| Acetylsolicylic acid | 250.0 |
| Caffeine | 50.0 |
| Cellulose, microcrystalline | 35.0 |
| Aluminum stearate | 5.0 |
| Total | 400.0 |

*Compounding procedure.*—The intimate mixture of the ingredients was briquetted, the briquets thus obtained were crushed in a suitable manner and forced through a screen of 1.5 mm. mesh-size. The resulting granulate was pressed into 400 mgm.-tablets. Each tablet contained 60 mgm. of the benzoxazepinone compound, 250 mgm. of acetylsalicylic acid and 50 mgm. of caffeine and, when administered perorally to a warm-blooded animal of about 60 kg. body weight in need of such treatment, produced very good analgesic and CNS stimulating effects.

Although the above dosage unit composition examples illustrate only one compound of the present invention as an active ingredient, it should be understood that any other compound embraced by Formula I or a non-toxic, pharmacologically acceptable acid addition salt thereof may be substituted for the particular benzoxazepinone compound in Examples 12 through 19. Moreover, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

I claim:
1. A compound of the formula

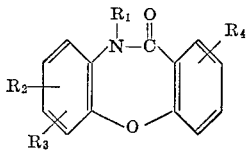

wherein:

$R_1$ is hydrogen or lower alkyl,
$R_2$ is hydrogen, halogen or lower alkyl, and
$R_3$ and $R_4$ are each hydrogen or amino, with the proviso that they are not both hydrogen or both amino at the same time, or a non-toxic, pharmacologically acceptable acid addition salt thereof.

2. A compound of the formula

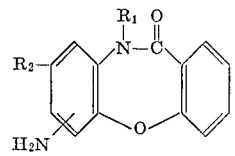

or

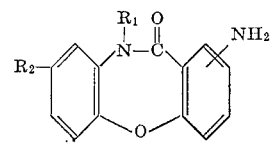

wherein:

$R_1$ is hydrogen or alkyl of 1 to 2 carbon atoms, and
$R_2$ is hydrogen, chlorine or methyl, or a non-toxic, pharmacologically acceptable acid addition salt thereof.

3. A compound according to claim 2, which is 2-amino-dibenz[b,f][1,4]oxazepin - 11(10H)-one or a non-toxic pharmacologically acceptable acid addition salt thereof.

4. A compound according to claim 2, which is 2-amino-10-methyl-dibenz[b,f][1,4]oxazepin - 11(10H) - one or a non-toxic, pharmacologically acceptable acid addition salt thereof.

5. A compound according to claim 2, which is 3-amino-dibenz[b,f][1,4]oxazepin - 11(10H) - one or a non-toxic, pharmacologically acceptable acid addition salt thereof.

6. A compound according to claim 2, which is 7-amino-dibenz[b,f][1,4]oxazepin - 11(10H) - one or a non-toxic, pharmacologically acceptable acid addition salt thereof.

7. A compound according to claim 2, which is 2-amino-8-chloro-dibenz[b,f][1,4]oxazepin - 11(10H) - one or a non-toxic, pharmacologically acceptable acid addition salt thereof.

8. A compound according to claim 2, which is 2-amino-8-methyl-dibenz[b,f][1,4]oxazepin - 11(10H) - one or a non-toxic, pharmacologically acceptable acid addition salt thereof.

References Cited

UNITED STATES PATENTS 3,367,930    2/1968    Schmutz et al.      260—239.3

HENRY R. JILES, Primary Examiner

R. T. BOND, Assistant Examiner

U.S. Cl. X.R.

424—244

PO-1050
(5/69)

UNITED STATES PATENT OFFICE
CERTIFICATE OF CORRECTION

Patent No. 3,546,214  Dated December 8, 1970

Inventor(s) GÜNTHER SCHMIDT

It is certified that error appears in the above-identified patent and that said Letters Patent are hereby corrected as shown below:

Col. 5, line 10: "(OH)" should read --(1OH)--;

line 23: "$C_4$" should read --$C_{14}$--;

line 73: "$C_{14}H_{13}ClN_2$" should read --$C_{14}H_{13}ClN_2O_2$--.

Col. 9, line 34: "Coca" should read --Cocoa--.

Col. 11, line 18: "Acetylsolicylic" should read --Acetylsali

Signed and sealed this 13th day of April 1971.

(SEAL)
Attest:

EDWARD M. FLETCHER, JR.
Attesting Officer

WILLIAM E. SCHUYLER
Commissioner of Pat